April 7, 1925.
1,532,945
H. QUIGLE
PRESSURE COOKER ATTACHMENT
Filed Aug. 6, 1923
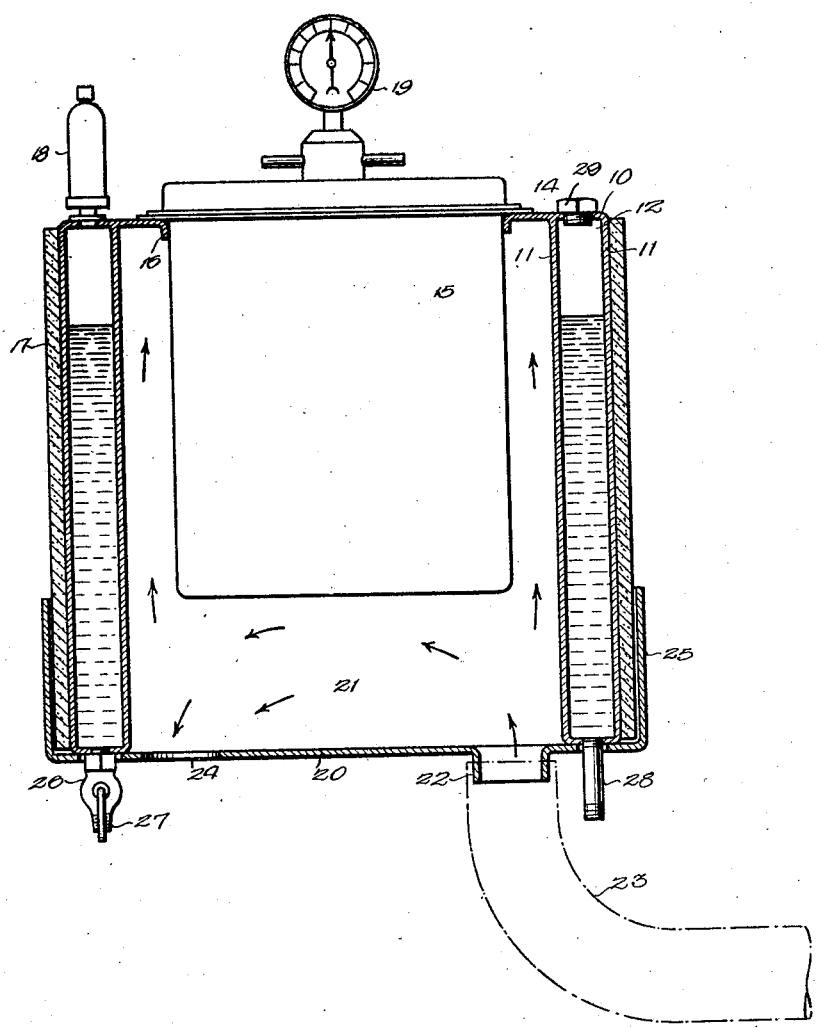
WITNESSES
INVENTOR
HARRY QUIGLE
BY
ATTORNEYS Patented Apr. 7, 1925.

1,532,945

UNITED STATES PATENT OFFICE.

HARRY QUIGLE, OF HASTINGS, NEBRASKA, ASSIGNOR TO MRS. LUCY QUIGLE, OF WHITTIER, CALIFORNIA.

PRESSURE-COOKER ATTACHMENT.

Application filed August 6, 1923. Serial No. 656,097.

*To all whom it may concern:*

Be it known that I, HARRY QUIGLE, a citizen of the United States of America, and a resident of Hastings, in the county of Adams and State of Nebraska, have invented a new and Improved Pressure-Cooker Attachment, of which the following is a description.

My invention relates to a pressure cooker having provision for heating water and the general object of the invention is to provide an efficient water heater in association with the cooker as well as to make provision for utilizing the exhaust products from the internal combustion engine of an automobile for furnishing the heat to the cooker and for the heating of the water.

A further object of the invention is to provide the water-heating attachment in association with the pressure cooker characterized by provision for connecting the air pump of the automobile with the water chamber to place the water under pressure and a hose attachment, whereby the water in the chamber may be utilized for a shower bath.

A further object of the invention is to provide a combined pressure cooker and water-heating attachment including a bottom adapted to be connected by a hose with the exhaust of a motor and with an outlet for the exhaust products as well as to make the bottom removable whereby it may be placed on a stove as an aid in cooking or may be utilized in taking a shower bath by entering the shower nozzle through said removable bottom when inverted.

Reference is to be had to the accompanying drawing in which the figure shows partly in vertical section and partly in elevation a pressure cooker equipped with my attachments, it being understood that the drawing is merely illustrative of one example of the invention.

In carrying out my invention in accordance with the illustrated example a receptacle 10 is provided having double walls 11 to provide a water space 12. The top 14 of the receptacle presents a central opening accommodating the food container or cooker proper 15 which may be of any approved type, said top having a flange 16 directed downwardly at the opening to engage the sides of the said cooker 15. A suitable covering or external coating 17 of heat-insulating material is applied to the outer one of the double walls 11. The numeral 18 indicates a safety valve on the water chamber at the top and 19 a pressure gage on the food container or cooker proper 15.

The structure is provided with a bottom 20 forming a closure of the space 21 surrounding the food container 15 at the sides and bottom. Said bottom 20 has a nipple 22 to which a hose indicated in dotted lines at 23 may be attached to connect the space 21 with the exhaust (not shown) of the motor of an automobile. The bottom 20 is further provided with an outlet hole 24 for the products of combustion. The bottom 20 is removably secured in place by its vertical flange 25 which fits outside of the heat-insulating covering 17.

The water chamber 12 at the bottom thereof has a valve 26 provided with a terminal 27 preferably threaded so that a hose may be attached for employing the structure as a shower bath. The chamber 12 also, at the bottom, has an inlet pipe 28 to which a hose from an air pump (not shown) may be attached for placing the water in the chamber 12 under pressure for shower bath purposes.

When the bottom 20 is removed it may be inverted and placed on a stove as an aid in cooking. Also, the shower nozzle may be passed through the nipple 22 or through the hole 24 in said bottom in taking a shower.

For the latter purpose the removed bottom is inverted and held in one's hand or otherwise supported and with the hose passed downwardly through the hole 24 the flange 25 prevents lateral splashing.

The arrangement is efficient in providing heat for the container 15 and exposes the maximum area of the water heater chamber to the action of the exhaust products.

The numeral 29 indicates a filling plug at the top of the water space 12.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. As a new article of manufacture, a receptacle a pressure cooker removably suspended in said receptacle, said receptacle having an inlet adapted to be connected with an exhaust to receive products of combustion and having an outlet for said products, said receptacle having double walls forming a water chamber, said chamber being separated laterally from the cooker to form a steam or hot air space therebetween so that the steam or air heats both the cooker and the water chamber, together with an inlet for said water space adapted to be connected with an air pump for placing the water under pressure and with a valve controlled outlet adapted to receive a hose.

2. A pressure cooker including a receptacle having double walls forming a water chamber, said chamber having a depending inlet pipe, and a bottom for said receptacle, said bottom having an upstanding flange removably held to said receptacle, said bottom being formed with a hole through which said inlet pipe passes, as well as with an opening, with a flange surrounding said opening and with another opening in addition to said hole and in addition to said first-mentioned opening.

HARRY QUIGLE.